USO09621551B2

(12) United States Patent
Lambert et al.

(10) Patent No.: US 9,621,551 B2
(45) Date of Patent: Apr. 11, 2017

(54) SYSTEMS AND METHODS FOR PROVIDING SECURE PRE-BOOT AND ROOT AUTHENTICATION TO AN INFORMATION HANDLING SYSTEM

(71) Applicant: Dell Products L.P., Round Rock, TX (US)

(72) Inventors: Timothy M. Lambert, Austin, TX (US); Johan Rahardjo, Austin, TX (US); Brian L. Brelsford, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 115 days.

(21) Appl. No.: 14/486,379

(22) Filed: Sep. 15, 2014

(65) Prior Publication Data
US 2016/0080377 A1 Mar. 17, 2016

(51) Int. Cl.
*H04L 29/06* (2006.01)
*G06F 21/57* (2013.01)

(52) U.S. Cl.
CPC ........ *H04L 63/0876* (2013.01); *G06F 21/575* (2013.01); *H04L 63/0435* (2013.01); *H04L 63/0485* (2013.01); *H04L 63/061* (2013.01); *H04L 63/08* (2013.01); *H04L 63/0853* (2013.01); *H04L 63/123* (2013.01)

(58) Field of Classification Search
CPC .................................................. H04L 63/0876
USPC .......................................................... 713/171
See application file for complete search history.

(56) References Cited

U.S. PATENT DOCUMENTS

2008/0028225 A1\* 1/2008 Eckert .................. H04L 63/164
713/182
2014/0025939 A1\* 1/2014 Smith ....................... G06F 9/24
713/2

\* cited by examiner

*Primary Examiner* — Jacob Lipman
(74) *Attorney, Agent, or Firm* — Jackson Walker L.L.P.

(57) ABSTRACT

In accordance with embodiments of the present disclosure, a method may include receiving a unique identifier associated with a host information handling system. The method may also include, responsive to receiving the unique identifier, communicating a signed unique identifier to the host information handling system, the signed unique identifier comprising the unique identifier signed with a private key. The method may further include enabling at least one of pre-boot access and root access by a client information handling system to an access controller responsive to the access controller decrypting the signed unique identifier with a public key corresponding to the private key and determining that the decrypted signed unique identifier and the unique identifier match.

14 Claims, 2 Drawing Sheets

SYSTEMS AND METHODS FOR PROVIDING SECURE PRE-BOOT AND ROOT AUTHENTICATION TO AN INFORMATION HANDLING SYSTEM

TECHNICAL FIELD

The present disclosure relates in general to information handling systems, and more particularly to providing secure pre-boot and root authentication to an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many consumers of information handling resources are increasingly demanding that manufacturers of information handling systems provide verifiable assurances that an information handling system ordered from the manufacturer has not been tampered with prior to receipt by the customer, or after delivery by a malicious entity. For example, without security measures in place, an interloper (e.g., a government intelligence agency, business competitor, or other person with harmful intent) could possibly intercept an information handling system during transit, and attack the information handling system via pre-boot or root access methods. Accordingly, mechanisms to eliminate or reduce such attacks are desired.

SUMMARY

In accordance with the teachings of the present disclosure, the disadvantages and problems associated with ensuring security of an information handling system may be reduced or eliminated.

In accordance with some embodiments of the present disclosure, an authenticator module for providing secure authentication between a client information handling system and an access controller of a host information handling system may include a communication interface and a control module. The communication interface may be configured to communicatively couple the authenticator module to the host information handling system. The control module may be in communication with the communication interface, and configured to receive a unique identifier associated with the host information handling system. The control module may also be configured to, responsive to receiving the unique identifier, communicate a signed unique identifier to the host information handling system, the signed unique identifier comprising the unique identifier signed with a private key. The control module may further be configured to, alone or in concert with the access controller, enable at least one of pre-boot access and root access by the client information handling system to the access controller responsive to the access controller decrypting the signed unique identifier with a public key corresponding to the private key and determining that the decrypted signed unique identifier and the unique identifier match.

In accordance with these and other embodiments of the present disclosure, a method may include receiving a unique identifier associated with a host information handling system. The method may also include, responsive to receiving the unique identifier, communicating a signed unique identifier to the host information handling system, the signed unique identifier comprising the unique identifier signed with a private key. The method may further include enabling at least one of pre-boot access and root access by a client information handling system to an access controller responsive to the access controller decrypting the signed unique identifier with a public key corresponding to the private key and determining that the decrypted signed unique identifier and the unique identifier match.

In accordance with these and other embodiments of the present disclosure, an article of manufacture may include a computer readable medium and computer-executable instructions carried on the computer readable medium, the instructions readable by a processor, the instructions, when read and executed, for causing the processor to receive a unique identifier associated with a host information handling system and, responsive to receiving the unique identifier, communicate a signed unique identifier to the host information handling system, the signed unique identifier comprising the unique identifier signed with a private key. The instructions may also cause the processor to enable at least one of pre-boot access and root access by a client information handling system to an access controller responsive to the access controller decrypting the signed unique identifier with a public key corresponding to the private key and determining that the decrypted signed unique identifier and the unique identifier match.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
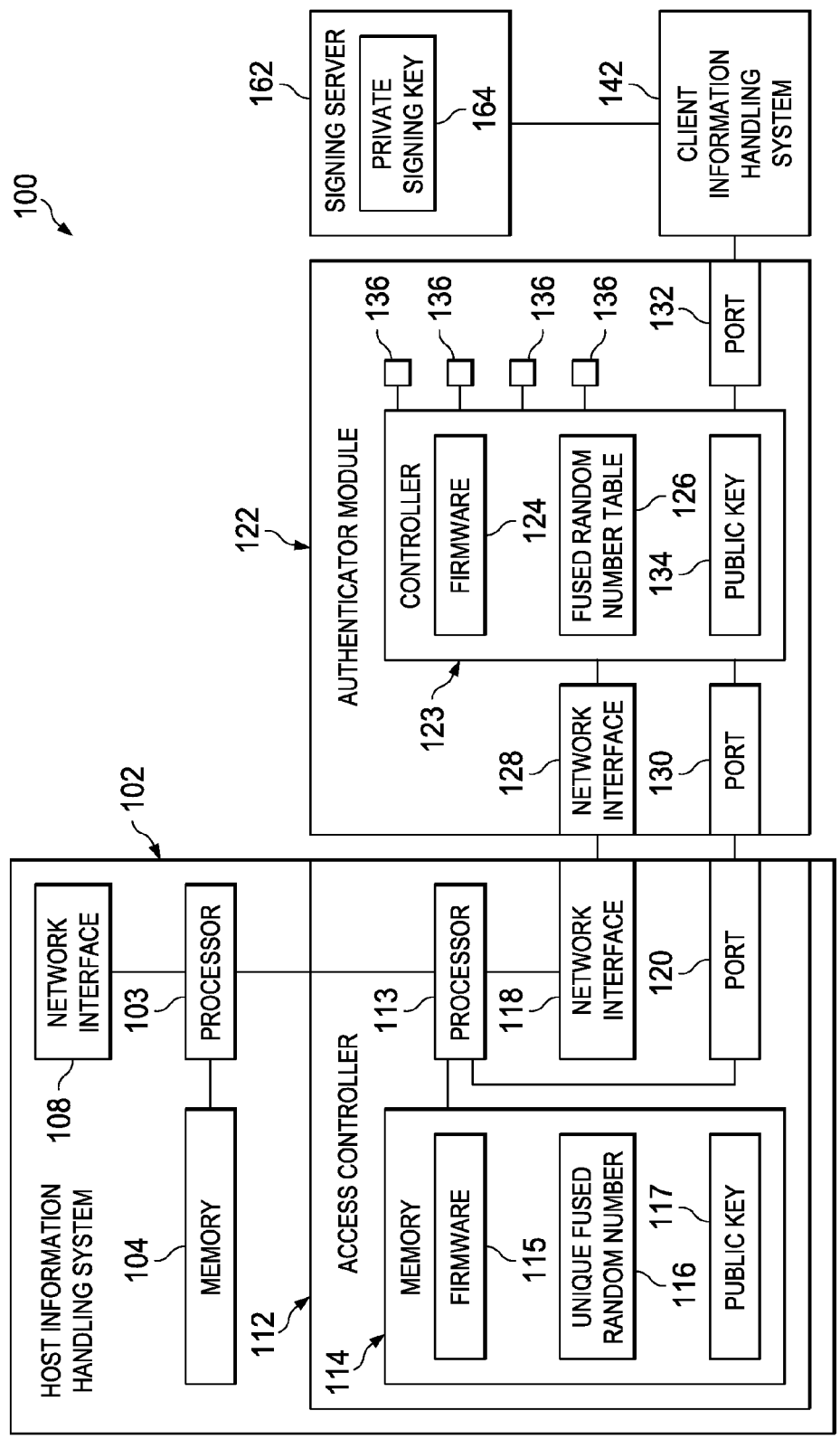
FIG. 1 illustrates a block diagram of an example system for providing secure pre-boot and root authentication to an information handling system, in accordance with embodiments of the present disclosure.
Figure 2:
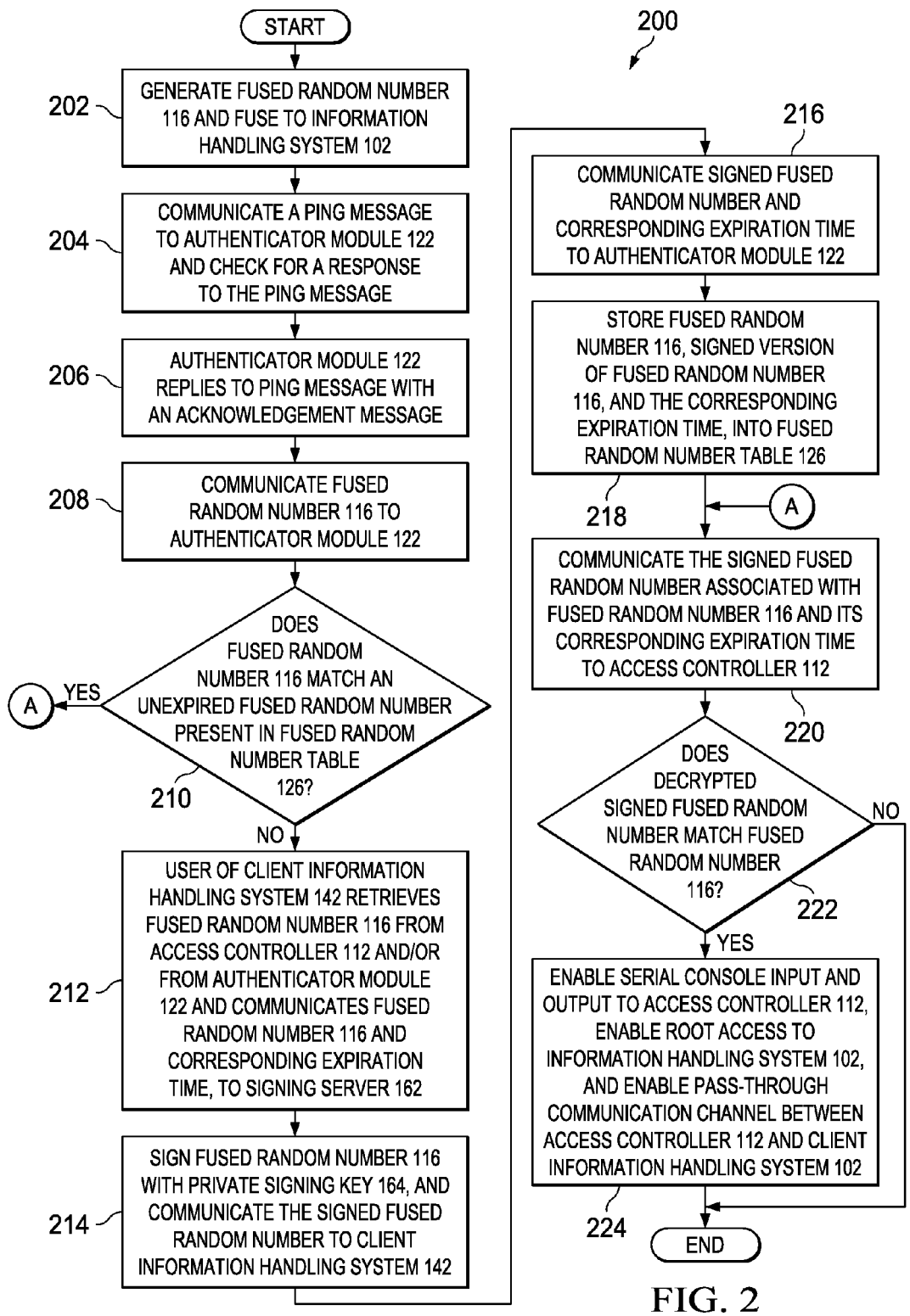
FIG. 2 illustrates a flow chart of an example method for providing secure pre-boot and root authentication to an information handling system, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of example system 100 for providing secure pre-boot and root authentication to a host information handling system 102, in accordance with embodiments of the present disclosure. As shown in FIG. 1, system 100 may include host information handling system 102, an authenticator module 122, a client information handling system 142, and a signing server 162.

In some embodiments, host information handling system 102 may be a personal computer. In some embodiments, host information handling system 102 may comprise or be an integral part of a server. In other embodiments, host information handling system 102 may be a portable information handling system (e.g., a laptop, notebook, tablet, handheld, smart phone, personal digital assistant, etc.). As depicted in FIG. 1, host information handling system 102 may include a processor 103, a memory 104 communicatively coupled to processor 103, a network interface 108 communicatively coupled to processor 103, and an access controller 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of host information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to host information handling system 102 is turned off.

Network interface 108 may comprise any suitable system, apparatus, or device operable to serve as an interface between host information handling system 102 and one or more other information handling systems. Network interface 108 may enable host information handling system 102 to communicate using any suitable transmission protocol and/or standard. In these and other embodiments, network interface 108 may comprise a network interface card, or "NIC."

Access controller 112 may be configured to provide out-of-band management facilities for management of host information handling system 102. Such management may be made by access controller 112 even if host information handling system 102 is powered off or powered to a standby state. Access controller 112 may include a processor 113, memory 114, an out-of-band network interface 118 separate from and physically isolated from in-band network interface 108, and a port 120. In certain embodiments, access controller 112 may include or may be an integral part of a baseboard management controller (BMC) or a remote access controller (e.g., a Dell Remote Access Controller or Integrated Dell Remote Access Controller). In other embodiments, access controller 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of host information handling system 102 or access controller 112.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to access controller 112 is turned off.

As shown in FIG. 1, memory 114 may have stored therein firmware 115, a unique fused random number 116, and a public key 117. Firmware 115 may include a program of executable instructions configured to be read and executed by processor 113 in order to carry out the functionality of access controller 112, as described herein. Unique fused random number 116 may include a unique random number for uniquely identifying host information handling system 102. In some embodiments, unique fused random number 116 may be generated by a random number generator implemented in firmware 115. Public key 117 may include any suitable cryptographic public key of a private-public key pair that may be used to encrypt and/or decrypt data, sign data, and/or verify a signature of data.

Network interface 118 may comprise any suitable system, apparatus, or device operable to serve as an interface between access controller 112 to one or more other information handling systems. Network interface 118 may enable access controller 112 to communicate using any suitable transmission protocol and/or standard. In these and other embodiments, network interface 118 may comprise a network interface card, or "NIC."

Port 120 may comprise any system, device, and apparatus configured to receive an external device and electrically couple such external device to access controller 112. For example, in some embodiments, an I/O port 120 may comprise a Universal Serial Bus (USB) port having a connector configured to receive a corresponding connector of a USB device (e.g., a USB key drive or thumb drive). In other embodiments, port 120 may comprise a serial port (e.g., an RS232 port). In yet other embodiments, port 120 may comprise any other type of suitable external port (e.g., Serial Advanced Technology Attachment (SATA), parallel port, etc.) to which any suitable device may be coupled.

In addition to processor 103, memory 104, network interface 108, and access controller 112, host information handling system 102 may include one or more other information handling resources. In some embodiments, host information handling system 102 may include a plurality of modular servers, in which case access controller 112 may store unique fused random numbers for each such server and may include a master cryptographic key for signing each such fused random number.

Authenticator module 122 may comprise any system, device, or apparatus configured to serve as an interface between a client information handling system 142 and access controller 112 in order to facilitate pre-boot or root access by client information handling system 142 to host information handling system 102. In the embodiments represented by FIG. 1, authenticator module 122 may comprise an intelligent dongle including components for physically interfacing between host information handling system 102 and client information handling system 142. As shown in FIG. 1, authenticator module 122 may include a network interface 128 communicatively coupled to controller 123, a port 130 communicatively coupled to controller 123, a port 132 communicatively coupled to controller 123, and one or more status indicators 136 communicatively coupled to controller 123.

Controller 123 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, controller 123 may interpret and/or execute program instructions and/or process data stored in computer-readable media of controller 123 and/or another component of authenticator module 122. As shown in FIG. 1, controller 123 may include memory or other computer-readable media for storing firmware 124, a fused random number table 126, and a public key 134. Firmware 124 may include a program of executable instructions configured to be read and executed by controller 123 in order to carry out the functionality of authenticator module 122, as described herein. Fused random number table 126 may include a list, map, array, table, or other suitable data structure for storing one or more entries, wherein each entry may set forth a fused random number associated with an information handling system (e.g., host information handling system 102 and/or other information handling systems), a signed fused random number corresponding to the fused random number for the entry, and an expiration time corresponding to the fused random number for the entry. Public key 134 may include any suitable cryptographic public key of a private-public key pair that may be used to encrypt and/or decrypt data, sign data, and/or verify a signature of data.

Network interface 128 may comprise any suitable system, apparatus, or device operable to serve as an interface between authenticator module 122 and a network interface 118 of information handling system 102. Network interface 128 may enable authenticator module 122 to communicate using any suitable transmission protocol and/or standard. In these and other embodiments, network interface 128 may comprise a network interface card, or "NIC."

Port 130 may comprise any system, device, and apparatus configured to couple authenticator module 122 to a corresponding port 120 of host information handling system 102.

Although FIG. 1 depicts authenticator module 122 coupled to access controller 112 via a network connection between network interfaces 118 and 128, and via ports 120 and 130, many embodiments may exist where authenticator module 122 comprises only one of network interface 128 or port 130, and thus may couple to access controller 112 via network interface 128 or port 130, but not both.

Port 132 may comprise any system, device, and apparatus configured to electrically couple access controller 112 to another device, such as client information handling system 142. For example, in some embodiments, an I/O port 132 may comprise a Universal Serial Bus (USB) port having a connector configured to receive a corresponding connector of a USB device (e.g., a USB key drive or thumb drive). In other embodiments, port 132 may comprise a serial port (e.g., an RS232 port). In yet other embodiments, port 132 may comprise any other type of suitable external port (e.g., Serial Advanced Technology Attachment (SATA), parallel port, etc.) to which any suitable device may be coupled.

Each visual status indicator 136 may include any system, device, or apparatus configured to provide a human visually-perceptible indication of a status of authenticator module 122. In some embodiments, a visual status indicator 136 may comprise a light-emitting diode (LED). As an example of functionality, a visual status indicator 136 may indicate that authenticator module 122 is powered on, while other visual status indicators 136 may give an indication of an authentication status associated with authenticator module 122.

In addition to controller 123, network interface 128, port 130, port 132, and visual indicators 136, host information handling system 102 may include one or more other information handling resources.

Client information handling system 142 may include any suitable information handling system for coupling to access controller 112 to obtain pre-boot or root access to host information handling system 102 (e.g., via authenticator module 122). Although not depicted in FIG. 1 for purposes of clarity and ease of exposition, client information handling system 142 may include any suitable combination of information handling resources for carrying out the functionality of client information handling system 142.

As shown in FIG. 1, client information handling system 142 may be coupled to signing server 162 (e.g., via an intranet of a manufacturer or other provider of host information handling system 102). Signing server 162 may include any suitable information handling system for coupling to a client host information handling system 102 for signing data (e.g., a fused random number) with a cryptographic private signing key 164 stored on computer-readable media of signing server 142. Private signing key 164 may be the private key of a public/private key pair comprising public keys 117 and/or 134. Although not depicted in FIG. 1 for purposes of clarity and ease of exposition, signing server 162 may include any suitable combination of information handling resources for carrying out the functionality of signing server 142.

In operation, and as described in greater detail below in reference to FIG. 2, authenticator module 122 may enable pre-boot, root access, and/or other capabilities between host information handling system 102 and client information handling system 142 via a handshake and cryptographic authentication method for which the security of such access is assured by a manufacturer or other provider of host information handling system 102.

FIG. 2 illustrates a flow chart of an example method 200 for providing secure pre-boot and root authentication to host information handling system 102. According to one embodiment, method 200 may begin at step 202. As noted above, teachings of the present disclosure may be implemented in a variety of configurations of system 100. As such, the preferred initialization point for method 200 and the order of the steps comprising method 200 may depend on the implementation chosen.

At step 202, during factory manufacture of host information handling system 102 or access controller 112, processor 113 may generate a fused random number 116, store fused random number 116 in memory 114, and lock fused random number 116 (e.g., thus "fusing" fused random number 116 with host information handling system 102).

At step 204, at each power up of access controller 112, a universal bootloader of access controller 112 executing on processor 113 may communicate a ping message to authenticator module 122 and check for a response to the ping message.

At step 206, authenticator module 122 may periodically check for receipt of a ping message from access controller 112. Once received, authenticator module 122 may reply with an acknowledgement message.

At step 208, in response to receiving the acknowledgment message from authenticator module 122, access controller 112 may communicate fused random number 116 to authenticator module 122.

At step 210, in response to receiving fused random number 116 from access controller 112, authenticator module 122 may determine if fused random number 116 matches an unexpired fused random number present in fused random number table 126. If fused random number 116 matches an unexpired fused random number present in fused random number table 126, method 200 may proceed to step 220. If fused random number 116 does not match an unexpired fused random number present in fused random number table 126, method 200 may proceed to step 212.

At step 212, in response to a determination that fused random number 116 does not match an unexpired fused random number present in fused random number table 126, a user of client information handling system 142 may retrieve fused random number 116 from access controller 112 and/or from authenticator module 122 and communicate fused random number 116, along with a corresponding expiration time, to signing server 162.

At step 214, signing server 162 may sign fused random number 116 with private signing key 164, and communicate the signed fused random number to client information handling system 142. At step 216, client information handling system 142 may communicate the signed fused random number, along with its corresponding expiration time, to authenticator module 122. At step 218, authenticator module 122 may store fused random number 116, the signed version of fused random number 116, and the corresponding expiration time, into fused random number table 126. After completion of step 218, method 200 may proceed to step 220.

At step 220, authenticator module 122 may communicate the signed fused random number associated with fused random number 116 and its corresponding expiration time to access controller 112.

At step 222, the universal bootloader executing on processor 113 may, provided the signed fused random number has not expired, decrypt the signed fused random number with public key 117, and determine if the decrypted signed fused random number matches fused random number 116. If the decrypted signed fused random number matches fused random number 116, method 200 may proceed to step 224. Otherwise, method 200 may end.

At step 224, in response to determining that the decrypted signed fused random number matches fused random number 116, the universal bootloader executing on processor 113 may enable serial console input and output to access controller 112, enable root access to host information handling system 102, and communicate a message to authenticator module 122 enabling authenticator module 122 to act as a pass-through communication channel between access controller 112 and client host information handling system 102. After completion of step 224, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software and/or firmware embodied in computer-readable media.

While the foregoing description contemplates authenticator module 122 as a physical dongle interfacing between host information handling system 102 and client information handling system 142, in some embodiments some or all of the functionality of authenticator module 122 may be implemented virtually as a program of instructions executable by client information handling system 142. In such embodiments, the virtualized authenticator module may implement a handshake and cryptographic authentication method similar or identical to that of method 200 using any supported interfaces of access controller 112 (e.g., by cabling a serial port of access controller 112 to a notebook computer that utilizes a terminal-based application that performs functionality of authenticator module 122).

In yet other embodiments, authenticator module 122 may be directly coupled to access controller 112 but not client information handling system 142, in which case communication between authenticator module 122 and information handling system 142 must pass through access controller 112 (e.g., by cabling a serial port of access controller 112 to a notebook computer and coupling authenticator module 122 to another port of access controller 122).

In addition, in some embodiments, host information handling system 102 may include a plurality of modular servers, in which case access controller 112 may store unique fused random numbers for each such server and may include a master cryptographic key for signing each such fused random number. In such embodiments, access controller 112 may serve as a proxy for the authentication of a client information handling system 142 to any of such modular servers, or may perform a one-to-many authentication (e.g., a chassis management controller may provide access or capability for such authentication to all baseboard management controllers associated with such servers or within a control domain of the chassis management controller).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An authenticator module for providing secure authentication between a client information handling system and an access controller of a host information handling system, comprising:
a communication interface for communicatively coupling the authenticator module to the access controller;
a control module in communication with the communication interface, and configured to:
receive a unique identifier associated with the host information handling system;
responsive to receiving the unique identifier, determine if any unexpired entry associated with the unique identifier is stored in an identifier table stored on computer-readable media accessible to the control module;
responsive to determining that an unexpired entry associated with the unique identifier is stored in the identifier table, retrieve a signed unique identifier from the identifier table;
responsive to determining no unexpired entry associated with the unique identifier is stored in the identifier table:
communicate the unique identifier to the client information handling system; and
receive the signed unique identifier and an expiration time from the client information handling system;
communicate a signed unique identifier to the host information handling system, the signed unique identifier comprising the unique identifier signed with a private key; and
alone or in concert with the access controller, enable at least one of pre-boot access and root access by the client information handling system to the host information handling system responsive to the access controller decrypting the signed unique identifier with a public key corresponding to the private key and determining that the decrypted signed unique identifier and the unique identifier match.

2. The authenticator module of claim 1, wherein the authenticator module is a physical dongle configured to couple to a communication interface of the host information handling system.

3. The authenticator module of claim 1, wherein the authenticator module is embodied by a program of instructions stored on computer-readable media of the client information handling system and executable by the client information handling system.

4. The authenticator module of claim 1, further comprising a second communication interface for communicatively coupling the authenticator module to the client information handling system.

5. The authenticator module of claim 1, wherein the first communication interface comprises a network interface.

6. The authenticator module of claim 1, wherein the first communication interface comprises a serial data port.

7. The authenticator module of claim 1, wherein the unique identifier is a random number.

8. The authenticator module of claim 1, wherein the client information handling system receives the signed unique identifier from a signing server in response to communicating the unique identifier to the signing server.

9. A method comprising:
receiving a unique identifier associated with a host information handling system;
responsive to receiving the unique identifier, determining if any unexpired entry associated with the unique identifier is stored in an identifier table stored on computer-readable media accessible to the control module;

responsive to determining that an unexpired entry associated with the unique identifier is stored in the identifier table, retrieving a signed unique identifier from the identifier table; and responsive to determining no unexpired entry associated with the unique identifier is stored in the identifier table:

communicating the unique identifier to the client information handling system; and receiving the signed unique identifier and an expiration time from the client information handling system;

communicating a signed unique identifier to an access of the host information handling system, the signed unique identifier comprising the unique identifier signed with a private key; and enabling at least one of pre-boot access and root access by a client information handling system to the host information handling system responsive to the access controller decrypting the signed unique identifier with a public key corresponding to the private key and determining that the decrypted signed unique identifier and the unique identifier match.

10. The method of claim 9, wherein the unique identifier is a random number.

11. The method of claim 9, wherein the client information handling system receives the signed unique identifier from a signing server in response to communicating the unique identifier to the signing server.

12. An article of manufacture comprising:

a computer readable medium; and computer-executable instructions carried on the computer readable medium, the instructions readable by a processor, the instructions, when read and executed, for causing the processor to:

receive a unique identifier associated with a host information handling system;

responsive to receiving the unique identifier, determine if any unexpired entry associated with the unique identifier is stored in an identifier table stored on computer-readable media accessible to the control module;

responsive to determining that an unexpired entry associated with the unique identifier is stored in the identifier table, retrieve a signed unique identifier from the identifier table;

responsive to determining no unexpired entry associated with the unique identifier is stored in the identifier table:

communicate the unique identifier to the client information handling system; and receive the signed unique identifier and an expiration time from the client information handling system;

communicate a signed unique identifier to an access of the host information handling system, the signed unique identifier comprising the unique identifier signed with a private key; and enable at least one of pre-boot access and root access to the host information handling system by a client information handling system responsive to the access controller decrypting the signed unique identifier with a public key corresponding to the private key and determining that the decrypted signed unique identifier and the unique identifier match.

13. The article of claim 12, wherein the unique identifier is a random number.

14. The article of claim 12, wherein the client information handling system receives the signed unique identifier from a signing server in response to communicating the unique identifier to the signing server.

* * * * *